United States Patent
Wakimoto

(10) Patent No.: US 11,245,162 B2
(45) Date of Patent: Feb. 8, 2022

(54) SECONDARY BATTERY

(71) Applicant: SANYO Electric Co., Ltd., Daito (JP)

(72) Inventor: Ryoichi Wakimoto, Hyogo (JP)

(73) Assignee: SANYO Electric Co., Ltd., Daito (JP)

( * ) Notice: Subject to any disclaimer, the term of this patent is extended or adjusted under 35 U.S.C. 154(b) by 24 days.

(21) Appl. No.: 16/790,162

(22) Filed: Feb. 13, 2020

(65) Prior Publication Data

US 2020/0313144 A1 Oct. 1, 2020

(30) Foreign Application Priority Data

Mar. 29, 2019 (JP) .............................. JP2019-065564

(51) Int. Cl.
*H01M 50/531* (2021.01)
*H01M 50/543* (2021.01)
(Continued)

(52) U.S. Cl.
CPC ....... *H01M 50/531* (2021.01); *H01M 50/528* (2021.01); *H01M 50/54* (2021.01);
(Continued)

(58) Field of Classification Search
CPC ......... H01M 2200/103; H01M 50/531; H01M 50/543; H01M 50/581; H01M 50/54;
(Continued)

(56) References Cited

U.S. PATENT DOCUMENTS

2011/0244280 A1 10/2011 Byun et al.
2016/0155998 A1* 6/2016 Wakimoto .......... H01M 50/103
429/94

(Continued)

FOREIGN PATENT DOCUMENTS

| JP | 2011-210717 A | 10/2011 | |
|---|---|---|---|
| JP | 2015-37046 A | 2/2015 | |
| JP | 2015037046 A | * 2/2015 | ............ Y02E 60/10 |
| JP | 2016095929 A | * 5/2016 | ............ Y02E 60/10 |
| JP | 2019-065564 A | 4/2019 | |

OTHER PUBLICATIONS

English Translation of JP 2016095929A, Airtight secondary battery, 2016, Toyota Motor Corp. (Year: 2016).*

(Continued)

*Primary Examiner* — Maria Laios
*Assistant Examiner* — Adam J Francis
(74) *Attorney, Agent, or Firm* — Westerman, Hattori, Daniels & Adrian, LLP

(57) ABSTRACT

A tab derived from an electrode body and a terminal of a battery are electrically connected to each other using a collector. The collector includes a first conductive member connected to a tab-side conductive member, and a second conductive member connected to a terminal-side conductive member. The collector opposes a sealing plate with an insulating member in between. A through hole and a thin portion provided at a peripheral edge of the through hole are provided in either one of the first conductive member and the second conductive member. The through hole and the other one of the conductive members are overlapped to join the peripheral edge of the through hole and the other one of the conductive members to each other so that the thin portion becomes a fuse. An insulating material is provided between the first conductive member and the second conductive member.

7 Claims, 8 Drawing Sheets

(51) Int. Cl.
  *H01M 50/581* (2021.01)
  *H01M 50/574* (2021.01)
  *H01M 50/583* (2021.01)
  *H01M 50/54* (2021.01)
  *H01M 50/528* (2021.01)

(52) U.S. Cl.
  CPC ....... *H01M 50/543* (2021.01); *H01M 50/574* (2021.01); *H01M 50/581* (2021.01); *H01M 50/583* (2021.01); *H01M 2200/103* (2013.01)

(58) Field of Classification Search
  CPC .. H01M 50/10; H01M 10/058; H01M 50/574; H01M 50/583; Y02E 60/10
  See application file for complete search history.

(56) References Cited

U.S. PATENT DOCUMENTS

2017/0054136 A1* 2/2017 Byun .................. H01M 50/572
2019/0296272 A1* 9/2019 Lee ..................... H01M 50/172

OTHER PUBLICATIONS

English Translation of JP 2015037046A, Power Storage element, 2015, GS Yuasa Corp. (Year: 2015).*

* cited by examiner

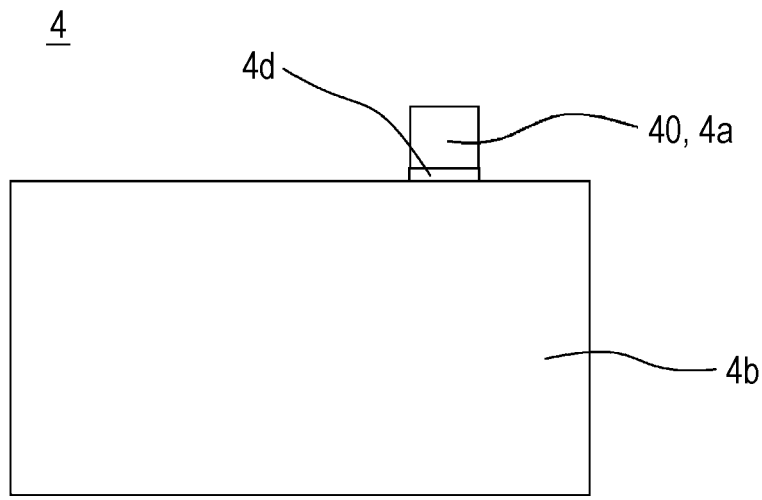
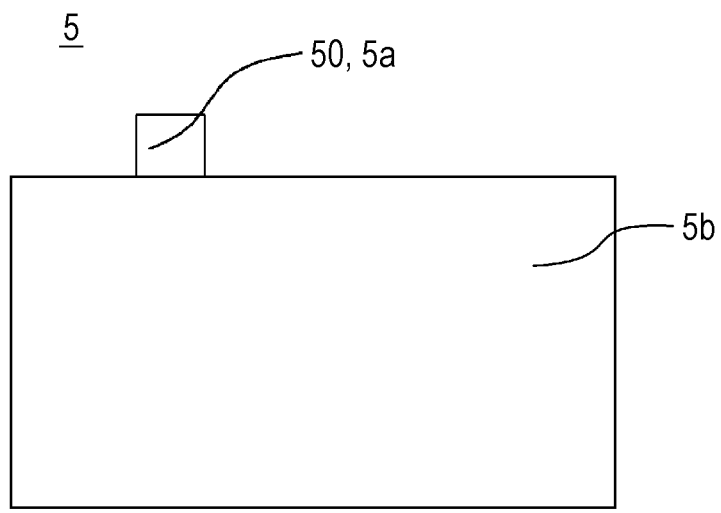

SECONDARY BATTERY

CROSS REFERENCE TO RELATED APPLICATIONS

The present invention application claims priority to Japanese Patent Application No. 2019-065564 filed in the Japan Patent Office on Mar. 29, 2019, the entire contents of which are incorporated herein by reference.

BACKGROUND OF THE INVENTION

Field of the Invention

The present disclosure relates to a secondary battery.

Description of Related Art

Square secondary batteries such as alkaline secondary batteries and nonaqueous electrolyte secondary batteries are used in power sources for driving electric vehicles (EV), hybrid electric vehicles (HEV, PHEV), and the like.

In such square secondary batteries, a battery case is configured of a bottomed cylindrical square outer package including an opening and a sealing plate that seals the opening. The battery case houses therein an electrode body including positive electrode plates, negative electrode plates, separators, and an electrolyte. A positive electrode terminal and a negative electrode terminal are attached to the sealing plate.

The positive electrode terminal is electrically connected to the positive electrode plates through a positive electrode collector, and the negative electrode terminal is electrically connected to the negative electrode plates through a negative electrode collector.

Furthermore, a secondary battery is proposed in which, in order to prevent the battery from becoming damaged by an overcurrent flowing through the battery, a fuse is provided in a collector that electrically connects terminals and electrode bodies to each other.

BRIEF SUMMARY OF THE INVENTION

Fuses in Japanese Published Unexamined Patent Application No. 2011-210717 (Patent Document 1) and Japanese Published Unexamined Patent Application No. 2015-37046 (Patent Document 2) are structured so that a through hole is provided midway of a collector. In order to effectively actuate the fuse, a member constituting the collector is largely cut out at the fuse portion. When the member is largely cut out, the strength thereof is decreased greatly. When the electrode body vibrates and the vibration is transmitted to the collector, the fuse portion may become sectioned and the battery may become unusable.

The present disclosure has been made to overcome the issue of the conventional technique described above, and provides a highly reliable secondary battery in which the strength of the collector does not become degraded.

A secondary battery according to an aspect of the present disclosure includes an electrode body including a tab, an outer package that houses the electrode body, a sealing plate that seals the outer package and that includes a terminal, and a collector that electrically connects the tab and the terminal to each other, in which the collector includes a first conductive member and a second conductive member, one of the conductive members, or either one of the first conductive member and the second conductive member is connected to the tab or a tab conductive member connected to the tab, and the other one of the conductive members is connected to the terminal or a terminal conductive member connected to the terminal, the one of the conductive members includes a through hole, and a peripheral edge of the through hole includes a thin portion that has a thickness smaller than those of other portions in the one of the conductive members, the through hole is overlapped with the other one of the conductive members so that the peripheral edge of the through hole is joined to the other one of the conductive members, and when an overcurrent flows from the tab to the terminal, the thin portion becomes thermally cut and cuts off an electric current.

The present disclosure can provide a secondary battery having a higher reliability.

BRIEF DESCRIPTION OF THE SEVERAL VIEWS OF THE DRAWINGS

FIG. 3 is a plan view of a positive electrode plate according to the exemplary embodiment.

FIG. 4 is a plan view of a negative electrode plate according to the exemplary embodiment.

DETAILED DESCRIPTION OF THE INVENTION

A configuration of a square secondary battery 20, which is a secondary battery according to an exemplary embodiment, will be described below. Note that the present disclosure is not limited to the following exemplary embodiment.

Figure 1:
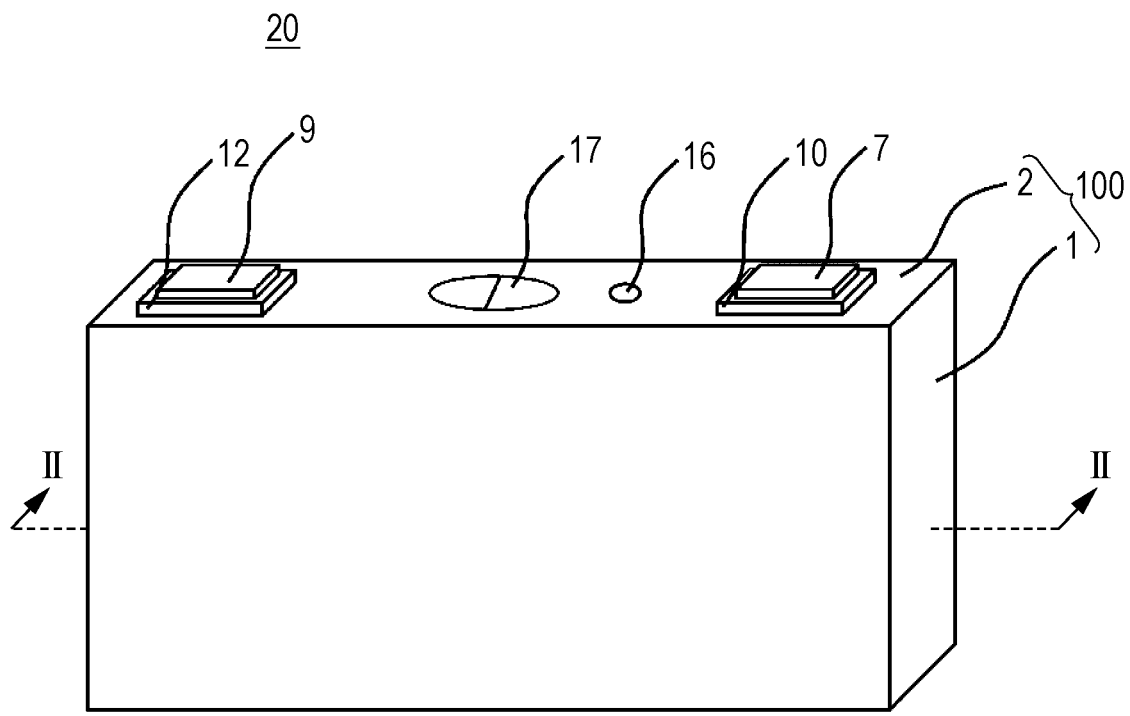
FIG. 1 is a perspective view of a secondary battery according to an exemplary embodiment.
Figure 2:
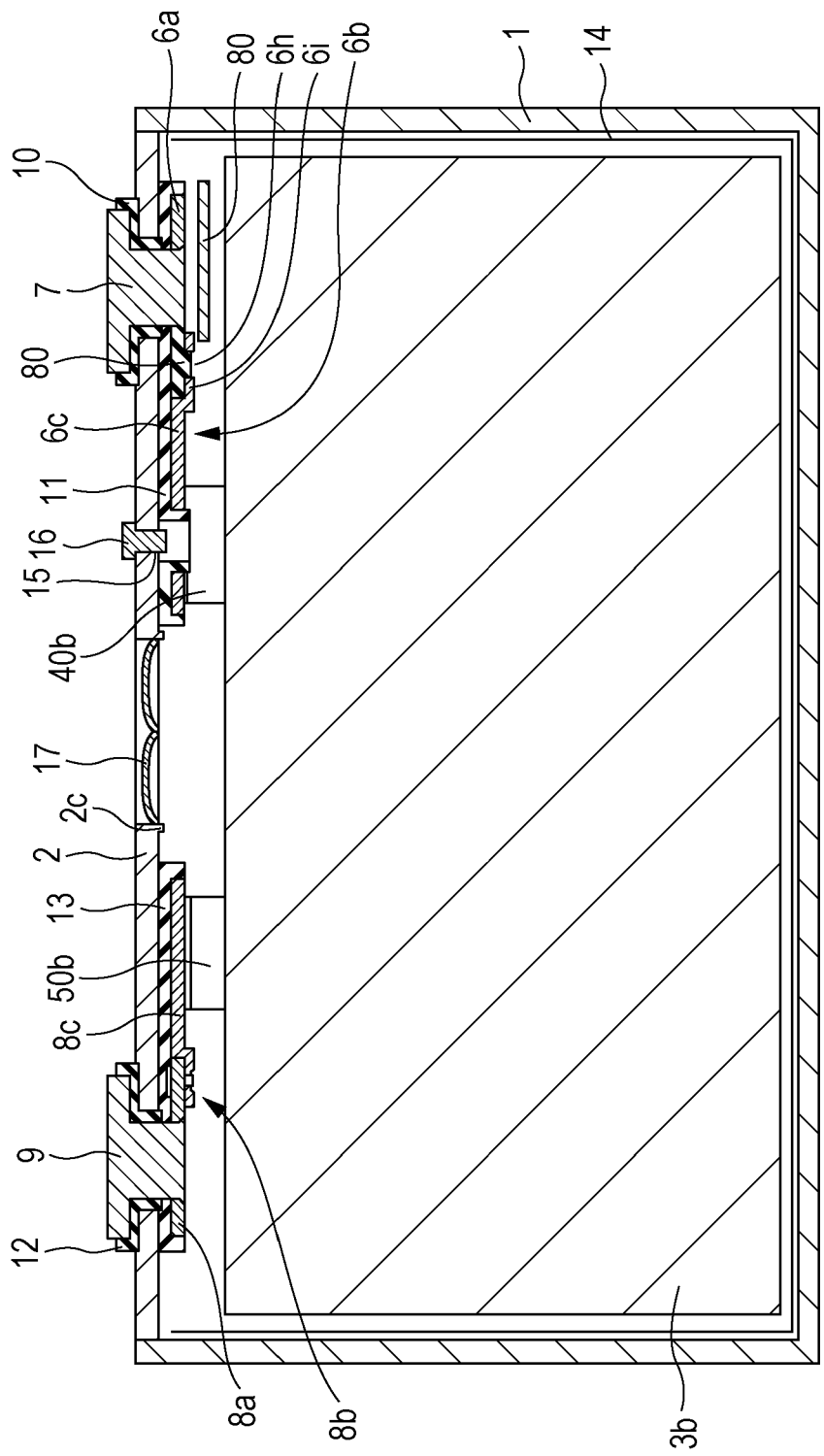
FIG. 2 is a cross-sectional view taken along line II-II in FIG. 1.

As illustrated in FIGS. 1 and 2, the square secondary battery 20 includes a battery case 100 formed of a bottomed and polygonal-tube-shaped square outer package 1 including an opening, and a sealing plate 2 that seals the opening of the square outer package 1. The square outer package 1 and the sealing plate 2 are, desirably, formed of metal and are, desirably, formed of aluminum or an aluminum alloy, for example. An electrode group 3 in which positive electrode plates and negative electrode plates are stacked with separators interposed therebetween are, together with an electrolyte, housed in the square outer package 1.

An electrolyte injection hole 15 is provided in the sealing plate 2, and the electrolyte injection hole 15 is sealed with a sealing member 16. A gas discharge valve 17 that breaks when the pressure inside the battery case 100 becomes equivalent to or higher than a predetermined value and that discharges gas inside the battery case 100 to the outside of the battery case 100 is provided in the sealing plate 2. An annular protrusion 2c is provided on a surface of the sealing plate 2 on a battery inner side and around the gas discharge valve 17.

Positive electrode tab groups 40a and 40b and negative electrode tab groups 50a and 50b are provided at an end portion of the electrode group 3 (electrode bodies 3a and 3b) on a sealing plate 2 side. The positive electrode tab groups 40a and 40b are electrically coupled to a positive electrode terminal 7 through a positive electrode collector 6b and a positive electrode terminal conductive member 6a. The negative electrode tab groups 50a and 50b are electrically coupled to a negative electrode terminal 9 through a negative electrode collector 8b and a negative electrode terminal conductive member 8a.

The positive electrode collector 6b, the positive electrode terminal conductive member 6a, and the positive electrode terminal 7 are desirably formed of metal, and, more desirably, are formed of aluminum or an aluminum alloy. An outer insulating member 10 is disposed between the positive electrode terminal 7 and the sealing plate 2. An inner insulating member 11 is disposed between the positive electrode collector 6b and the positive electrode terminal conductive member 6a, and the sealing plate 2.

The negative electrode collector 8b, the negative electrode terminal conductive member 8a, and the negative electrode terminal 9 are, desirably, formed of metal and are, more desirably, formed of copper or a copper alloy. An outer insulating member 12 is disposed between the negative electrode terminal 9 and the sealing plate 2. An inner insulating member 13 is disposed between the negative electrode collector 8b and the negative electrode terminal conductive member 8a, and the sealing plate 2.

An electrode body holder 14 formed of a resin sheet is disposed between the electrode group 3 and the square outer package 1. The electrode body holder 14 is, desirably, formed of a resin sheet folded and formed into a bag shape or a box shape.

A method of manufacturing the square secondary battery 20 and details of the components thereof will be described next.

Positive Electrode Plate

FIG. 3 is a plan view of a positive electrode plate 4. The positive electrode plate 4 includes a main body portion in which a positive electrode active material mixture layer 4b including a positive electrode active material is formed on each of the two surfaces of a rectangular positive electrode core body 4a. The positive electrode core body 4a protrudes from an edge of the main body portion. The protruded positive electrode core body 4a constitutes the positive electrode tab 40. Note that the positive electrode tab 40 may be a portion of the positive electrode core body 4a, as illustrated in FIG. 3, or another member may be connected to the positive electrode core body 4a as the positive electrode tab 40. Positive electrode protective layers 4d, each having an electrical resistance that is larger than an electrical resistance of each positive electrode active material mixture layer 4b, are desirably provided in portions of the positive electrode tabs 40 adjacent to the positive electrode active material mixture layers 4b. Note that, desirably, metal foil such as aluminum foil or aluminum alloy foil is used for the positive electrode core body 4a. Desirably, lithium-transition metal composite oxide is used for the positive electrode active material.

Negative Electrode Plate

FIG. 4 is a plan view of a negative electrode plate 5. The negative electrode plate 5 includes a main body portion in which a negative electrode active material mixture layer 5b including a negative electrode active material is formed on each of the two surfaces of a rectangular negative electrode core body 5a. The negative electrode core body 5a protrudes from an edge of the main body portion. The protruded negative electrode core body 5a constitutes the negative electrode tab 50. Note that the negative electrode tab 50 may be a portion of the negative electrode core body 5a, as illustrated in FIG. 4, or another member may be connected to the negative electrode core body 5a as the negative electrode tab 50. Note that metal foil such as copper foil or copper alloy foil is used as the negative electrode core body 5a. Desirably, a material such as a carbon material or a material including silicon is used for the negative electrode active material.

Fabrication of Electrode Body

Figure 5:
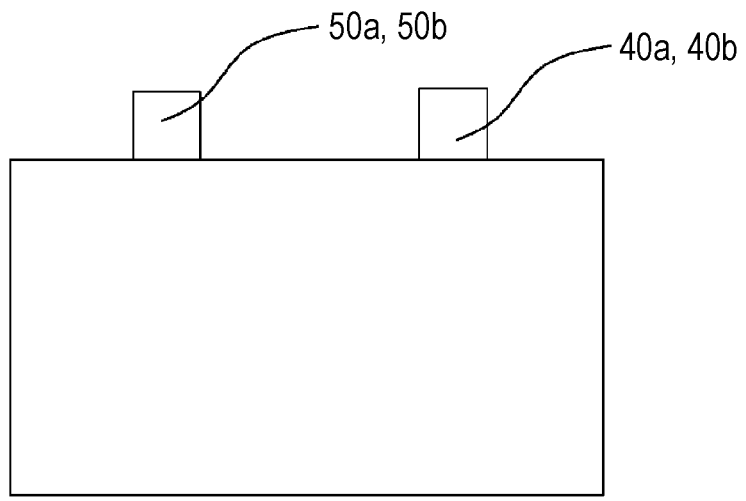
FIG. 5 is a plan view of an electrode body according to the exemplary embodiment.

Stacked electrode bodies 3a and 3b are fabricated by fabricating, with the above-described method, 50 pieces of positive electrode plates 4 and 51 pieces of negative electrode plates 5 and by stacking the above with a rectangular polyethylene separator in between. As illustrated in FIG. 5, the stacked electrode bodies 3a and 3b include, at one end portion, the positive electrode tab groups 40a and 40b in which the positive electrode tabs 40 of the positive electrode plates 4 are stacked, and the negative electrode tab groups 50a and 50b in which negative electrode tabs 50 of the negative electrode plates 5 are stacked. Separators are disposed on the outer surfaces of the electrode bodies, and by winding an adhesive tape or the like around the outer peripheral surfaces, the electrode plates and the separators can be fixed in a stacked state. Alternatively, an adhesion layer may be provided on each surface of the separators so that the separators and the positive electrode plates 4, and the separators and the negative electrode plates 5 are adhered to each other.

Note that the size of the separator in plan view is, desirably, the same as that of the negative electrode plate 5 or is larger than that of the negative electrode plate 5. Each positive electrode plate 4 or each negative electrode plate 5 may be disposed between two separators and after heat welding the outer peripherals of the separators, the positive electrode plates 4 and the negative electrode plates 5 may be stacked on each other. Alternatively, the stacked electrode body may be formed by folding a long separator in a zigzag manner and by alternately disposing the positive electrode plate 4 and the negative electrode plate 5 between the folds to stack the positive electrode plates 4 and the negative electrode plates 5 on each other. Furthermore, a wound electrode body may be formed by winding a belt-shaped positive electrode plate and a belt-shaped negative electrode plate with a belt-shaped separator interposed in between.

Connecting Collectors and Tabs to Each Other

Figure 6:
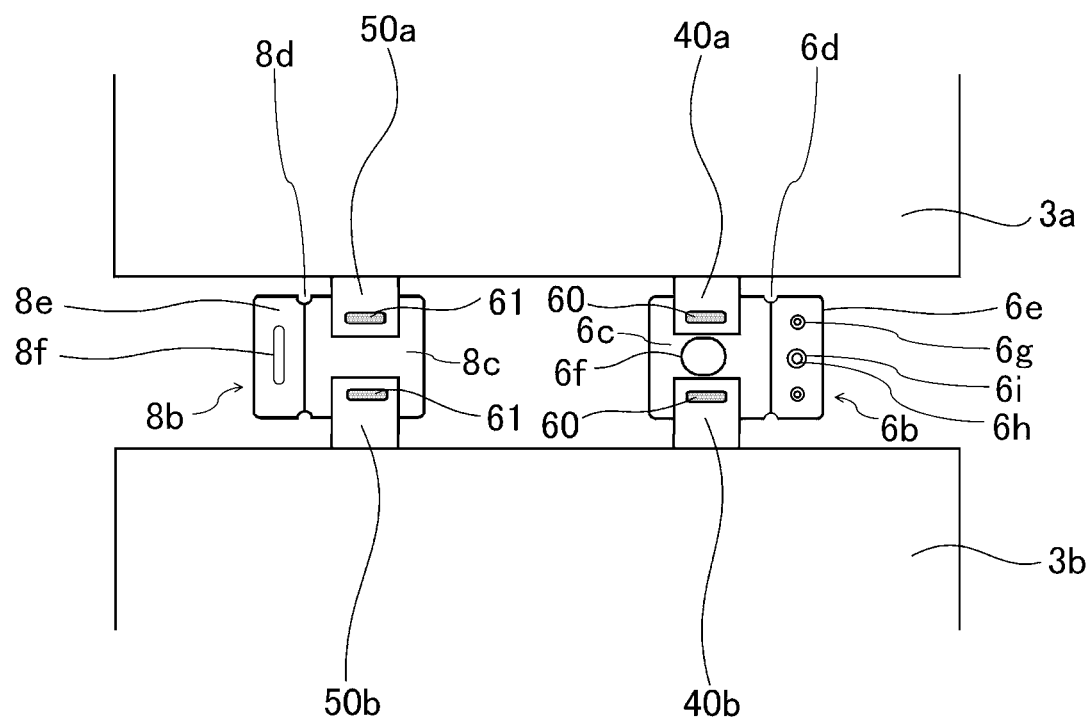
FIG. 6 is a diagram illustrating a state in which positive electrode tab groups are connected to a positive electrode collector, and negative electrode tab groups are connected to a negative electrode collector.

FIG. 6 is a diagram illustrating a state in which the positive electrode tab groups 40a and 40b are connected to the positive electrode collector 6b and in which the negative electrode tab groups 50a and 50b are connected to the negative electrode collector 8b. The positive electrode collector 6b is constituted by a first connection portion 6c serving as a tab-side connection portion connected at the connecting portion 6d, and a second connection portion 6e serving as a terminal-side connection portion. The negative electrode collector 8b is constituted by a first connection portion 8c serving as a tab-side connection portion connected at the connecting portion 8d, and a second connection portion 8e serving as a terminal-side connection portion. Note that a direction that extends along flat surfaces of the collectors 6b and 8b and that is perpendicular to a direction in which the first connection portion 6c, the connecting portion 6d, and the second connection portion 6e or in which the first connection portion 8c, the connecting portion 8d, and the second connection portion 8e are connected to each other is referred to as a width direction, and a direction orthogonal to the flat surfaces is referred to as a thickness direction.

Bending may be performed on the connecting portions 6d and 8d so that a difference in level is provided between each first connection portion and the corresponding second connection portion. By providing a difference in level, connection with the other conductive members will be facilitated. In providing the difference in level, by having the width of the connecting portion be smaller than those of the first connection portion and the second connection portion, bending of the connecting portion is facilitated.

According to FIG. 6, the positive electrode tab groups 40a and 40b are connected to the first connection portion 6c of the positive electrode collector 6b, and the negative electrode tab groups 50a and 50b are connected to the first connection portion 8c of the negative electrode collector 8b. As illustrated in FIG. 6, the electrode bodies 3a and 3b are disposed so that distant ends of the positive electrode tab groups 40a and 40b oppose each other and so that the distant ends of the negative electrode tab groups 50a and 50b oppose each other. The positive electrode tab groups 40a and 40b are disposed on the first connection portion 6c, and the negative electrode tab groups 50a and 50b are disposed on the first connection portion 8c. The positive electrode tab groups 40a and 40b are each welded and connected to the first connection portion 6c so that welds 60 are formed. The negative electrode tab groups 50a and 50b are each welded and connected to the first connection portion 8c so that welds 61 are formed. The welding method is desirably ultrasonic welding or resistance welding, and the connecting may be performed by laser welding. Alternatively, a tab conductive member (not shown) connected to the positive electrode tabs 40 may be separately prepared, the tab conductive member may be connected to the first connection portion, and the positive electrode tab groups 40a and 40b and the first connection portion 6c may be connected to each other through the tab conductive member.

Configuration of Sealing Plate

Figure 7:
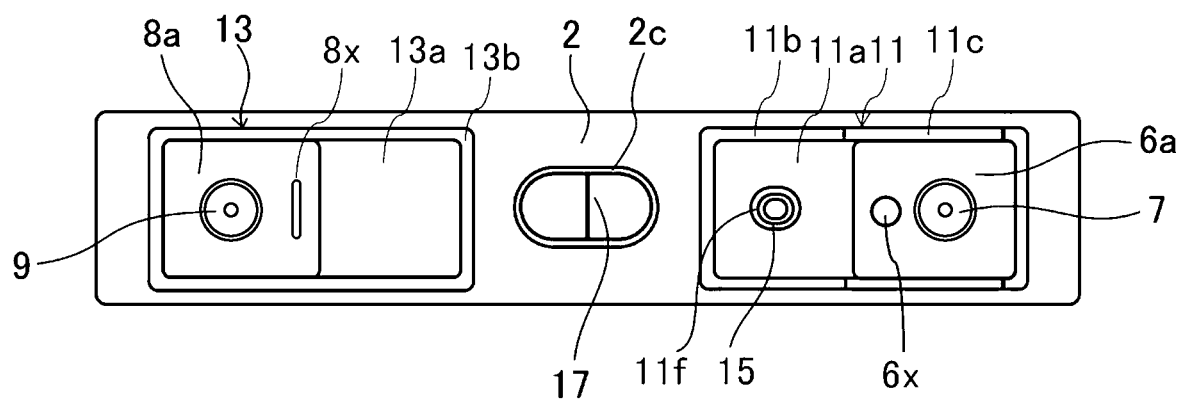
FIG. 7 is a diagram of the sealing plate to which components have been installed, viewed from an electrode group side.

FIG. 7 is a diagram of the sealing plate 2 viewed from the electrode group 3 side after the positive electrode terminal 7, the outer insulating member 10 (not shown), the inner insulating member 11, the positive electrode terminal conductive member 6a, the negative electrode terminal 9, the outer insulating member 12 (not shown), the inner insulating member 13, and the negative electrode terminal conductive member 8a have been attached.

The sealing plate 2, the outer insulating member 10, the inner insulating member 11, the positive electrode terminal conductive member 6a, the outer insulating member 12, the inner insulating member 13, and the negative electrode terminal conductive member 8a each has a through hole through which the positive electrode terminal 7 or the negative electrode terminal 9 can be inserted.

Figure 8:
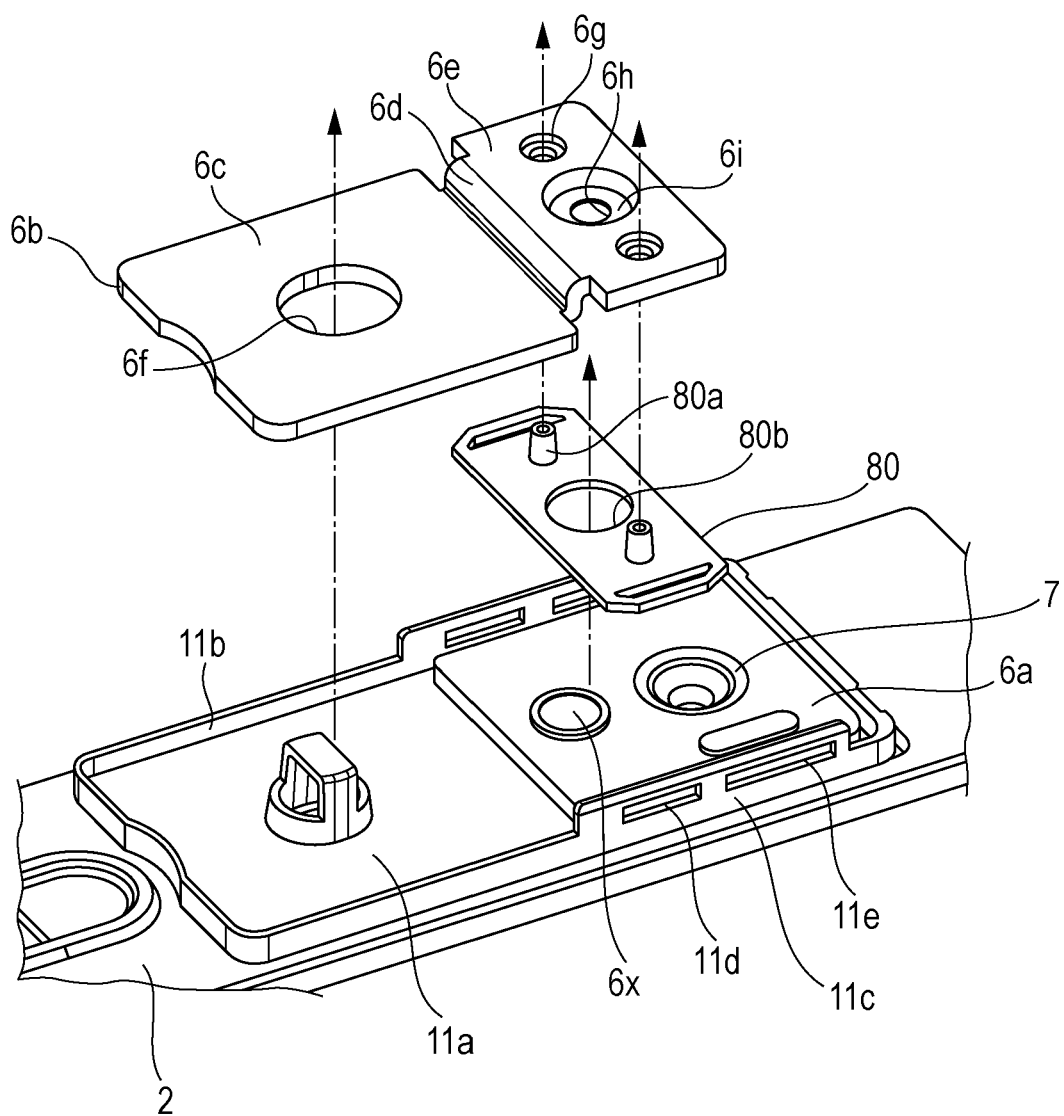
FIG. 8 is a diagram illustrating a stacked state of the positive electrode collector, a fuse insulating material, and a positive electrode terminal conductive member.

Referring to FIGS. 7 and 8, the inner insulating member 11 on the positive electrode side includes a base portion 11a disposed along the sealing plate 2. A rib 11b that protrudes towards the electrode group 3 side from the base portion 11a is provided on an outer peripheral edge of the base portion 11a. Wall portions 11c that extend the rib 11b towards the electrode group 3 side is provided in the rib 11b or at a portion near the two sides of the positive electrode terminal conductive member 6a that extends along the longitudinal direction of the sealing plate 2. Furthermore, through holes 11d and 11e described below are formed in the wall portions 11c. An opening 11f is provided in the base portion 11a so as not to close the injection hole 15. The opening 11f does not have to be provided when the base portion 11a does not close the ejection hole 15.

Referring to FIG. 7, the inner insulating member 13 on the negative electrode side includes a base portion 13a disposed along the sealing plate 2. A rib 13b that protrudes towards the electrode group 3 side from the base portion 13a is provided on an outer peripheral edge of the base portion 13a.

A protrusion 6x is provided on a surface of the positive electrode terminal conductive member 6a on the electrode group 3 side.

A protrusion 8x is provided on a surface of the negative electrode terminal conductive member 8a on the electrode group 3 side. A shape of the protrusion 8x in plan view is, desirably, a shape including a longitudinal direction and a short direction such as a rectangle, an elliptic, or a track shape.

Assembling Each Component to Sealing Plate

The outer insulating member 10 is disposed on an outer surface side of the battery and in a vicinity of a positive electrode terminal insertion hole provided in the sealing plate 2. The inner insulating member 11 and the positive electrode terminal conductive member 6a are disposed on an inner surface side of the battery and in the vicinity of positive electrode terminal insertion hole of the sealing plate 2. Furthermore, the positive electrode terminal 7 is inserted through the through hole of the outer insulating member 10, the positive electrode terminal insertion hole of the sealing plate 2, the through hole of the inner insulating member 11, and the through hole of the positive electrode terminal conductive member 6a from the outer side of the battery, and an end of the positive electrode terminal 7 is riveted onto the positive electrode terminal conductive member 6a. With the above, the positive electrode terminal 7 and the positive electrode terminal conductive member 6a are fixed to the sealing plate 2 (see FIG. 10). Note that the riveted portion of the positive electrode terminal 7 and the positive electrode terminal conductive member 6a can be welded to each other.

Subsequently, the outer insulating member 12 is disposed on an outer surface side of the battery and in a vicinity of a negative electrode terminal insertion hole 2b in the sealing plate 2. The inner insulating member 13 and the negative electrode terminal conductive member 8a are disposed on an inner surface side of the battery and in the vicinity of negative electrode terminal insertion hole 2b of the sealing plate 2. Furthermore, the negative electrode terminal 9 is inserted through the through hole of the outer insulating member 12, the negative electrode terminal insertion hole of the sealing plate 2, the through hole of the inner insulating member 13, and the through hole of the negative electrode terminal conductive member 8a from the outer side of the battery, and an end of the negative electrode terminal 9 is riveted onto the negative electrode terminal conductive member 8a. With the above, the negative electrode terminal 9 and the negative electrode terminal conductive member 8a are fixed to the sealing plate 2. Note that the riveted portion of the negative electrode terminal 9 and the negative electrode terminal conductive member 8a can be welded to each other.

Connecting Terminal Conductive Member and Collector to Each Other

FIG. 8 is a diagram illustrating a stacked state of the positive electrode collector 6b, a fuse insulating material 80, and the positive electrode terminal conductive member 6a. Note that in the above drawing, illustration of the positive electrode tab groups 40a and 40b is omitted.

According to FIG. 8, fuse insulating material fixing holes 6g, a fuse portion opening 6h, and a fuse-portion thin portion 6i, which is provided in a peripheral edge of the fuse portion opening 6h, are provided in the second connection portion 6e of the positive electrode collector 6b. An opening 6f is provided in the first connection portion 6c so as not to close the injection hole 15. When the first connection portion 6c does not close the injection hole 15, the opening 6f does not have to be provided.

The fuse insulating material 80 includes protrusions 80a and an opening 80b.

Through holes 11d that fix the fuse insulating material 80, and through holes 11e that fix a terminal protecting member 81 are provided in the wall portions 11c of the inner insulating member 11.

The protrusion 6x of the positive electrode terminal conductive member 6a is passed through the opening 80b and the fuse insulating material 80 is mounted on the positive electrode terminal conductive member 6a. Subsequently, end portions of the fuse insulating material 80 are fixed to the through holes 11d of the inner insulating member 11 by a method such as snap-fit or the like.

The protrusions 80a of the fuse insulating material 80 is inserted through the fuse insulating material fixing holes 6g of the second connection portion 6e so that the second connection portion 6e is mounted on the fuse insulating material 80 and so that the first connection portion 6c is mounted on the base portion 11a of the inner insulating member 11. Subsequently, the end portion of the protrusions 80a inserted through the fuse insulating material fixing holes 6g are crushed by hot pressing or the like, and the fuse insulating material 80 is fixed to the second connection portion 6e. Accordingly, the peripheral edge of the fuse portion opening 6h and the protrusion 6x of the positive electrode terminal conductive member 6a are joined to each other and a fuse portion is formed. Regarding the joining method, the two members can be joined to each other by irradiation of an energy line such as a laser beam.

The fixing of the fuse insulating material 80 and the positive electrode collector 6b to each other is not limited to the method described above and, for example, fixing by snap-fit or a method such as insert molding can be used.

In the fuse portion, when an overcurrent that is equivalent to or larger than the setting flows through the collector, the fuse-portion thin portion 6i is thermally cut and the electric current is cut off. The fusing current of the fuse portion can be set by adjusting the area and thickness of the thin portion.

After the fusing, the fuse insulating material 80 holds the collector 6b and the inner insulating member 11 together. Accordingly, the collector 6b is prevented from falling onto the electrode group. Furthermore, since the fuse insulating material 80 fixes the collector 6b, and the positional relationship between the collector 6b and the positive electrode terminal conductive member 6a is maintained after the fusing, reconduction of the thermally cut portion is prevented.

Referring to FIGS. 6 and 7, the first connection portion 8c of the negative electrode collector 8b to which the negative electrode tab groups 50a and 50b have been connected is disposed on the base portion 13a of the inner insulating member 13, and the second connection portion 8e is mounted on the negative electrode terminal conductive member 8a. A through hole 8f including a thin portion is provided in the peripheral edge of the second connection portion 8e, and the through hole 8f and the protrusion 8x provided in the negative electrode terminal conductive member 8a are fitted to each other. Accordingly, the fitting portion is joined. Regarding the joining method, the fitting portion can be joined by irradiation of an energy line such as a laser beam.

Figure 9:
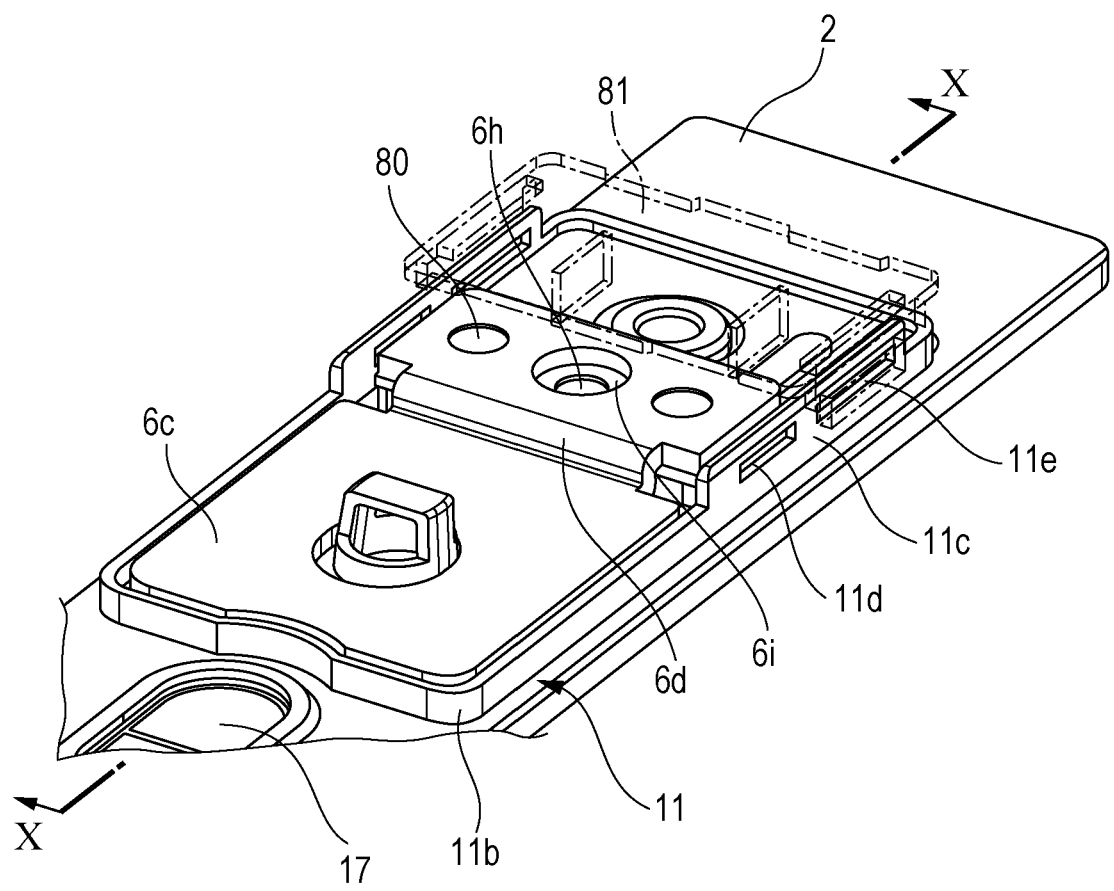
FIG. 9 is a perspective view of the positive electrode terminal of the sealing plate viewed from the electrode group side.
Figure 10:
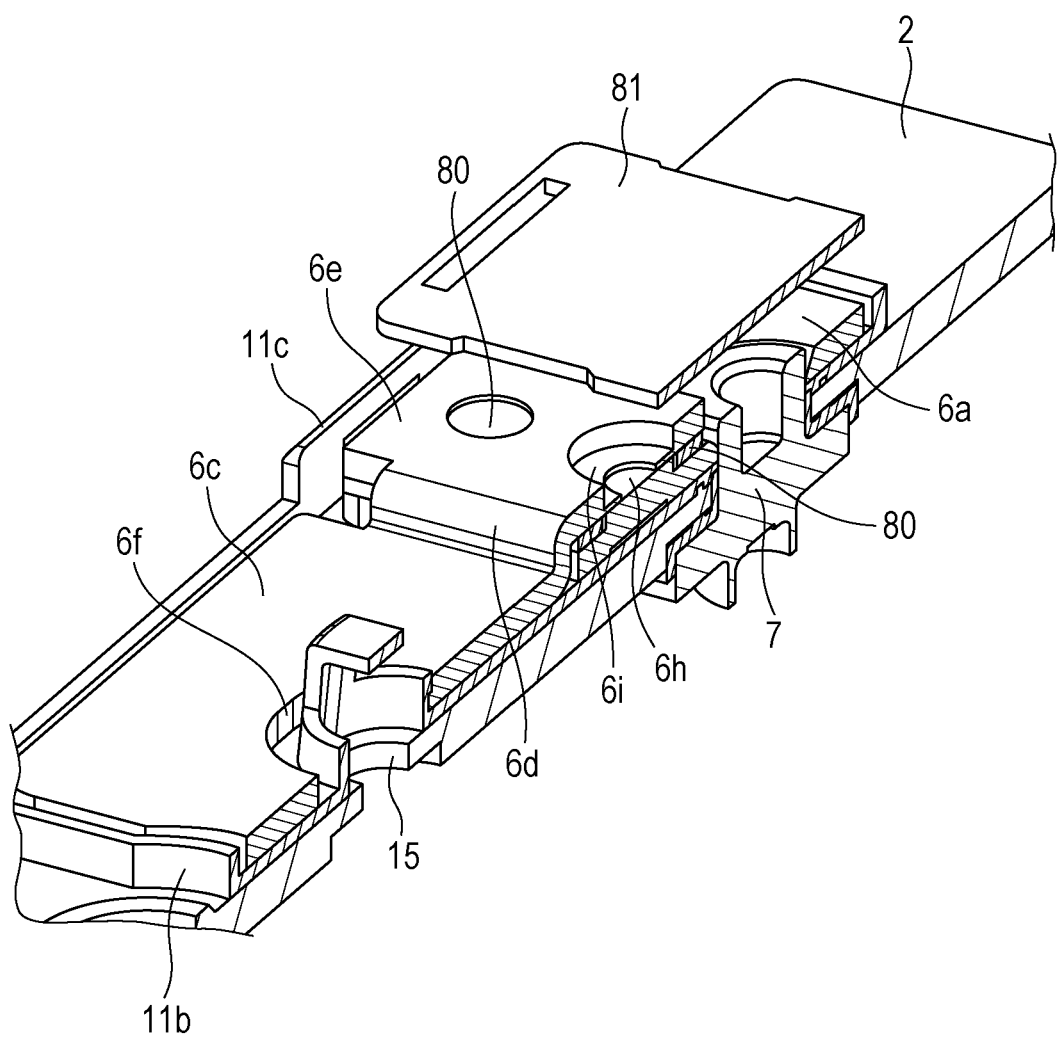
FIG. 10 is a cross-sectional perspective view taken along line X-X in FIG. 9.

FIG. 9 is a perspective view of an essential portion and illustrates a vicinity of the positive electrode terminal in the sealing plate 2 viewed from the electrode group side. The components under the terminal protecting member 81 are illustrated in a see-through manner. FIG. 10 is a cross-sectional perspective view taken along line X-X in FIG. 9. In FIGS. 9 and 10, illustration of the positive electrode tab groups 40a and 40b is omitted.

Referring to FIGS. 9 and 10, the terminal protecting member 81 straddling the positive electrode terminal conductive member 6a is fitted and fixed to the through holes 11e provided in the wall portions 11c of the inner insulating member 11. The terminal protecting member 81 prevents short-circuiting caused by the positive electrode terminal 7 and the electrode bodies 3a and 3b coming in contact with each other.

Fabrication of Electrode Group

Stacking-direction surfaces of the electrode body 3a and the electrode body 3b are made to oppose each other directly or through another member while the positive electrode tab groups 40a and 40b and the negative electrode tab groups 50a and 50b are bent accordingly. With the above, the electrode body 3a and the electrode body 3b are unified as a single electrode group 3. The electrode bodies 3a and 3b can be fixed to each other by winding an adhesive tape or the like around the outer peripheral surfaces of the unified electrode bodies 3a and 3b. Alternatively, the electrode bodies 3a and 3b can be unified as one by disposing the electrode bodies 3a and 3b inside the electrode body holder 14 formed in a box shape or a bag shape.

The electrode group 3 wrapped in the electrode body holder 14 made of a resin sheet formed in a box shape or a bag shape is inserted into the square outer package 1. Subsequently, the sealing plate 2 and the opening of the square outer package 1 are fitted to each other and the fitted portion is welded so that the opening of the square outer package 1 is sealed with the sealing plate 2. Subsequently, the electrolyte is injected into the square outer package 1 through the electrolyte injection hole 15 provided in the sealing plate 2. After the above, the electrolyte injection hole 15 is sealed with a sealing member 16 such as a blind rivet.

In the square secondary battery 20 according to the exemplary embodiment described above, the positive electrode tab groups 40a and 40b and the negative electrode tab groups 50a and 50b are disposed at the end portions of the electrode group 3 on the sealing plate 2 side. Furthermore, the positive electrode tab groups in the bent state are connected to a surface of the positive electrode collector 6b, which is disposed along the sealing plate 2, on the electrode group 3 side. Furthermore, the negative electrode tab groups in the bent state are connected to a surface of the negative electrode collector 8b, which is disposed along the sealing plate 2, on the electrode group 3 side. With such a configuration, the secondary battery becomes one with a higher volume energy density.

Others

In the exemplary embodiment described above, an example in which the electrode group 3 is formed of two electrode bodies 3a and 3b has been given; however, it is not limited to the above. The electrode group 3 may be configured of three or more electrode bodies. Furthermore, each of the electrode bodies is not limited to a stacked electrode body and may be a wound electrode body in which a belt-shaped positive electrode plate and a belt-shaped negative electrode plate having a belt-shaped separator interposed in between are wound. The stacked electrode body may only include the electrode body 3a. Furthermore, the electrode body 3a may be a wound electrode body in which a belt-shaped positive electrode plate and a belt-shaped negative electrode plate having a belt-shaped separator interposed in between are wound.

The fuse insulating material 80, the terminal protecting member 81, the outer insulating members 10 and 12, and the inner insulating members 11 and 13 may use an insulating member, which is desirably made of resin. For example, polyethylene (PP), polyethylene (PE), or polyphenylene sulfide (PPS) may be used.

A laser beam or an electron beam can be used as the energy line used in welding.

Known materials can be used for the positive electrode plate, the negative electrode plate, the separator, the electrolyte, and other members. The battery system of the secondary battery of the present disclosure is not limited to any battery system. For example, the battery system may be a nonaqueous electrolyte secondary battery such as a lithium ion battery. Furthermore, the shape of the secondary battery of the present disclosure is not limited to a particular shape.

While detailed embodiments have been used to illustrate the present invention, to those skilled in the art, however, it will be apparent from the foregoing disclosure that various changes and modifications can be made therein without departing from the spirit and scope of the invention. Furthermore, the foregoing description of the embodiments according to the present invention is provided for illustration only, and is not intended to limit the invention.

What is claimed is:

1. A secondary battery comprising:
an electrode body including a tab;
an outer package that houses the electrode body;
a sealing plate that seals the outer package and that includes a terminal; and
a collector that electrically connects the tab and the terminal to each other, wherein
the collector includes a first conductive member and a second conductive member,
one of the conductive members, or either one of the first conductive member and the second conductive member is connected to the tab or a tab conductive member connected to the tab, and other one of the conductive members is connected to the terminal or a terminal conductive member connected to the terminal,
the one of the conductive members includes a through hole, and a peripheral edge of the through hole includes a thin portion that has a thickness smaller than those of other portions in the one of the conductive members,
the through hole is overlapped with the other one of the conductive members so that the peripheral edge of the through hole is directly connected to the other one of the conductive members, and
when an overcurrent flows from the tab to the terminal, the thin portion becomes thermally cut and cuts off an electric current.

2. The secondary battery according to claim 1, wherein the through hole has a circular shape.

3. The secondary battery according to claim 1 further comprising an insulating material between the one of the conductive members and the other one of the conductive members and at a portion other than the thin portion and the through hole.

4. The secondary battery according to claim 3, wherein the insulating material is fixed to the one of the conductive members.

5. The secondary battery according to claim 4, wherein the one of the conductive members includes a through hole that fixes the insulating material, the insulating material being fixed by entering inside the through hole.

6. The secondary battery according to claim 1, wherein
the one of the conductive members includes a tab-side connection portion, a terminal-side connection portion, and a connecting portion that connects the tab-side connection portion and the terminal-side connection portion to each other,
the tab-side connection portion is connected to the tab or the tab conductive member connected to the tab,
the terminal-side connection portion includes the through hole at a middle portion of the terminal-side connection portion, and the thickness of the thin portion included in the peripheral edge of the through hole is smaller than those of other portions in the terminal-side connection portion.

7. The secondary battery according to claim 6, wherein the connecting portion connects the tab-side connection portion and the terminal-side connection portion to each other so that there is a difference in level therebetween.

* * * * *